(12) United States Patent
Bruschelli

(10) Patent No.: US 7,620,474 B2
(45) Date of Patent: Nov. 17, 2009

(54) METHOD FOR MANUFACTURING A TYRE

(75) Inventor: Luca Bruschelli, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 10/583,774

(22) PCT Filed: Dec. 29, 2003

(86) PCT No.: PCT/IB03/06221

§ 371 (c)(1),
(2), (4) Date: Aug. 1, 2008

(87) PCT Pub. No.: WO2005/065923

PCT Pub. Date: Jul. 21, 2005

(65) Prior Publication Data

US 2008/0290539 A1    Nov. 27, 2008

(51) Int. Cl.
B29C 35/02    (2006.01)
B29D 30/10    (2006.01)
(52) U.S. Cl. .................. 700/199; 700/97; 700/106; 425/29; 264/40.4
(58) Field of Classification Search .............. 700/199, 700/106, 97; 264/40.4, 264; 425/29
See application file for complete search history.

(56) References Cited

U.S. PATENT DOCUMENTS 4,895,692 A    1/1990    Laurent et al.
4,963,207 A    10/1990   Laurent
6,868,716 B2 *  3/2005   Okano et al. .................. 73/146
2004/0145083 A1 * 7/2004 Mancosu et al. ............ 264/326

FOREIGN PATENT DOCUMENTS

EP     0 928 680 B1    7/1999
EP     0 928 702 B1    7/1999
WO    WO 01/00395 A1   1/2001
WO    WO 02/087863 A2  11/2002
WO    WO 02/096630 A1  12/2002

* cited by examiner

*Primary Examiner*—Ramesh B Patel
*Assistant Examiner*—Steven R Garland
(74) *Attorney, Agent, or Firm*—Finnegan, Henderson, Farabow, Garrett & Dunner, L.L.P.

(57) ABSTRACT

A method of manufacturing tires by disposing an uncured elastomeric material on a substantially rigid toroidal support so as to form a green tire. The green tire and the toroidal support are then disposed within a vulcanization mold in which a molding cavity is defined, so as to mold and cure the green tire. The molding cavity includes at least a portion in which molding and curing are carried out at a constant volume. The disposition of the elastomeric material onto the rigid toroidal support is carried out by controlling the volume distribution of the elastomeric material onto the toroidal support, so as to fit a predetermined curve of excess material volume, i.e., a curve showing a difference between the volume distribution of the material forming the green tire and the available volume in the portion of the molding cavity adapted for molding and curing the green tire at constant volume, versus a predetermined, e.g. radial, direction.

32 Claims, 8 Drawing Sheets

METHOD FOR MANUFACTURING A TYRE

CROSS REFERENCE TO RELATED APPLICATION

This application is a national phase application based on PCT/IB2003/006221, filed Dec. 29, 2003, the content of which is incorporated herein by reference.

BACKGROUND OF THE INVENTION

1. Field of the Invention

The present invention relates to a method for manufacturing a tyre. More particularly, the present invention relates to a method for manufacturing a tyre wherein a green tyre is assembled onto a rigid toroidal support, and then molded and cured in a vulcanization mold defining a molding cavity, which includes at least a portion in which molding and curing are performed at a constant volume.

2. Description of the Related Art

Generally, in a tyre production cycle, after a manufacturing process in which the different tyre components are formed and assembled to provide a green tyre (i.e. an uncured or raw tyre), a molding and curing process is carried out for the purpose of stabilizing the tyre structure to a given geometric conformation, generally characterized by a particular tread pattern. To this aim, the tyre is introduced into a vulcanization mold, typically comprising a pair of side parts adapted to be axially moved close to each other, which are arranged to operate on the tyre bead and sidewalls, and at least one series of circumferentially distributed sectors adapted to be radially moved close to each other, so as to operate on the tyre tread band. In more detail, side parts and sectors are mutually movable between an open condition, in which they are spaced apart from each other to enable loading of the tyre being processed, and a closed condition, in which they define a molding cavity, the inner surface of which is the same as the outer surface of the tyre to be obtained.

In a known method of molding and curing a tyre, a rigid toroidal support having the same configuration as the inner surface of the tyre to be obtained is arranged within the tyre. For example, U.S. Pat. No. 4,895,692 discloses a mold for molding and curing an elastomeric tyre comprising a rigid core defining an interior surface of the tyre, two side parts and a peripheral ring divided into a plurality of segments. The members of the mold assure the molding of the exterior and interior surfaces of the tyre and completely define a molding space for the tyre. The vulcanization is therefore effected with constant volume.

A different approach is disclosed in PCT patent application WO 01/00395, that discloses a method in which a green tyre manufactured on a toroidal support is closed in a vulcanization mold. The side portions of the tyre are sandwiched between the mold side parts and the toroidal support. Steam or another fluid under pressure is fed to a diffusion interspace formed, due to tyre expansion, between the inner surface of the tyre and the outer surface of the toroidal support. More particularly, following closure of the mold, the tyre is enclosed in a holding space confined between the outer surface of the toroidal support and the inner walls of the molding cavity. The holding space when the mold is closed has a volume greater than the volume taken up by the tyre itself. In more detail, the holding space has two radially inner portions of shape and size substantially corresponding to the shape and size of the side portions of the tyre, and a radially outer portion confined between said radially inner portions, of radial dimensions greater than the radial dimensions, i.e. thickness, measured on the radially outer portion of the tyre itself Recently new methods for manufacturing tyres have been proposed which do not need separate manufacturing of semi-finished products used in the traditional methods, for example the tread band, the sidewall strips, the carcass plies, the belt strips and the bead cores, just to mention the main ones. According to the above innovative processes, those semi-finished products are replaced by a few number of basic components which are manufactured "in situ" when the green tyre is assembled. These basic components are elongated elements, usually in the form of a strip or of a ribbon, made from raw elastomeric material, possibly reinforced with one or more reinforcing cords.

This new process for the assembly of the tyre is carried out by means of deposition, on the abovementioned toroidal support, of the above basic components designed to form the structural parts of the tyre (substantially corresponding to the parts made with the usual semi-finished products according to conventional manufacturing methods), using few types of movement, such as radial deposition, directed towards the axis of rotation of the toroidal support, and circumferential deposition onto the surface of the toroidal support made to rotate about its axis, or a combination of the two.

The basic components are supplied to said toroidal support in the form of continuous elongated elements. The radially deposited components may be cut beforehand into portions of predefined size, while the circumferentially deposited components are cut after winding onto the drum. These basic components have typically a cross section with dimensions smaller than those of the structural part to be constructed.

Once the assembly steps are concluded, the green tyre prepared with the above described method is closed in a vulcanization mold, for instance of the type disclosed in the above cited patent application WO 01/00395, and eventually cured.

SUMMARY OF THE INVENTION

The Applicant has noticed that the above-mentioned process allows a very high degree of manufacturing flexibility, since, owing to the substantial similarity of the basic components for each type of tyre, only a limited number of parameters controlling the revolutions of the toroidal support for the components applied circumferentially and the axial extension of the radially applied components are to be varied to produce different tyre models.

Notwithstanding, the Applicant has verified that some difficulties may arise in the definition of the specifications to be provided to the machinery that controls the movement of the toroidal support, in order to obtain a correct deposition of the basic components thereon, when a new tyre is planned for production. In particular, it has been verified that subsequently to the deposition of the basic components on the toroidal support, problems may arise during molding and curing, especially in the portions where vulcanization is performed at a constant volume.

More specifically, it has been found that an excess of elastomeric material in the constant volume portion of the mold may cause uncontrolled movements of elastomeric material within the mold, possibly leading to unacceptable defects and/or geometrical distortions in the finished tyre. This causes a continuous re-definition of the specifications to be provided to the machinery in order to correctly control the movement of the toroidal support during the compound deposition, until the correct specifications have been found. The Applicant has verified that this may cause, when a different tyre is planned for production, a high quantity of scraps in the tyre manufacturing process, i.e. a high quantity of tyres to be discarded due to presence of defects or geometrical distortions. Furthermore, this also increases the time-to-the-market of the new tyre to be produced.

Furthermore, the Applicant has noticed that a control only of the overall volume of the material disposed on the rigid toroidal support versus the overall available volume in the molding cavity may not be sufficient to guarantee the obtainment of a cured tyre without defects and/or geometrical distortions.

The Applicant has tackled the problem of reducing the quantity of scraps in a manufacturing process of tyres involving a molding and curing in a vulcanization mold comprising a portion in which vulcanization is carried out at a constant volume. In particular, the Applicant has tackled the problem of determining, in a reduced time, the specifications for a correct deposition of the elastomeric material on a toroidal support to be inserted in such a vulcanization mold, especially when new tyres are planned for production.

The Applicant has found that these problems may be solved by deriving and analyzing a curve showing the volume distribution of the elastomeric material versus the available volume in the constant volume portion of the molding cavity. In the remainder of the description and in the claims, a curve of this kind will be referred as an "excess material volume curve". Explicit preferred functions suitable for determining an excess material volume curve will be given in the remainder of the description.

In particular, the Applicant has found that a curve of this kind related to the material distribution in a green tyre of a first tyre model, leading to finished tyres that, after molding and curing, are practically free from defects and/or geometrical distortions, may be used as target curve for determining specifications for preparing green tyres of a second tyre model, different from the first tyre model (e.g., having a different size or different geometrical proportions, or a different stiffness of some part, such as sidewalls, or a different disposition of elastomeric fillings and/or inserts, or a different sidewall profile, or a different sidewall height, etc.). The Applicant has found that this method may greatly reduce the quantity of scraps, as well as the-time-to-the-market of the second tyre model.

In a first aspect, the invention relates to a method for manufacturing a tyre comprising:
- disposing an uncured elastomeric material on a substantially rigid support, so as to form a green tyre;
- inserting said green tyre disposed on said support into a vulcanization mold;
- closing the vulcanization mold so as to define a molding cavity between an outer surface of said support and an inner surface of said vulcanization mold;
- molding and curing the green tyre, at least one portion of the green tyre being molded and cured at a substantially constant volume in at least one portion of said molding cavity;

wherein the step of disposing said uncured elastomeric material on the support comprises:
- determining a first excess material volume curve of said elastomeric material with respect to an available volume in said at least one portion of the molding cavity, versus a predetermined direction;
- controlling a volume distribution of said elastomeric material on said rigid support so as to substantially fit said first curve.

In a second aspect, the invention relates to a method for controlling a disposition of an uncured elastomeric material on a rigid support, for the manufacturing of a green tyre to be molded and cured in a vulcanization mold, said vulcanization mold and said rigid support defining a molding cavity such that at least one portion of the green tyre is molded and cured at a substantially constant volume in at least one portion of said molding cavity, said method comprising:
- providing a first positioning specification set for a machinery associated to a deposition of said uncured elastomeric material on said support;
- providing a cross-section profile of at least said portion of the molding cavity;
- determining, from said first positioning specification set and from said molding cavity cross-section profile, a first excess material volume curve of said uncured elastomeric material with respect to an available volume in said portion of the molding cavity, versus a predetermined direction.

In a third aspect, the invention relates to a computer program directly loadable into a memory of a computer, for performing a method for controlling a disposition of an uncured elastomeric material on a rigid support for the manufacturing of a green tyre to be molded and cured in a vulcanization mold, said vulcanization mold and said rigid support defining a molding cavity such that at least one portion of the green tyre is molded and cured at a substantially constant volume in at least one portion of said molding cavity, the program comprising code portions being adapted for:
- acquiring a first positioning specification set for a machinery associated to a deposition of said uncured elastomeric material on said support;
- acquiring a cross-section profile of at least said portion of the molding cavity;
- determining, from said first positioning specification set and from said molding cavity cross-section profile, a first excess material volume curve of said uncured elastomeric material with respect to an available volume in said portion of the molding cavity, versus a predetermined direction.

In a fourth aspect, the invention relates to a computer program product comprising a computer readable medium on which the computer program of the third aspect of the invention is stored.

BRIEF DESCRIPTION OF THE DRAWINGS

Other features and advantages of the present invention will be made apparent by the following detailed description of some exemplary embodiments thereof, provided merely by way of non-limitative examples, description that will be made by referring to the attached drawings, wherein.

DETAILED DESCRIPTION OF THE INVENTION

Figure 1:
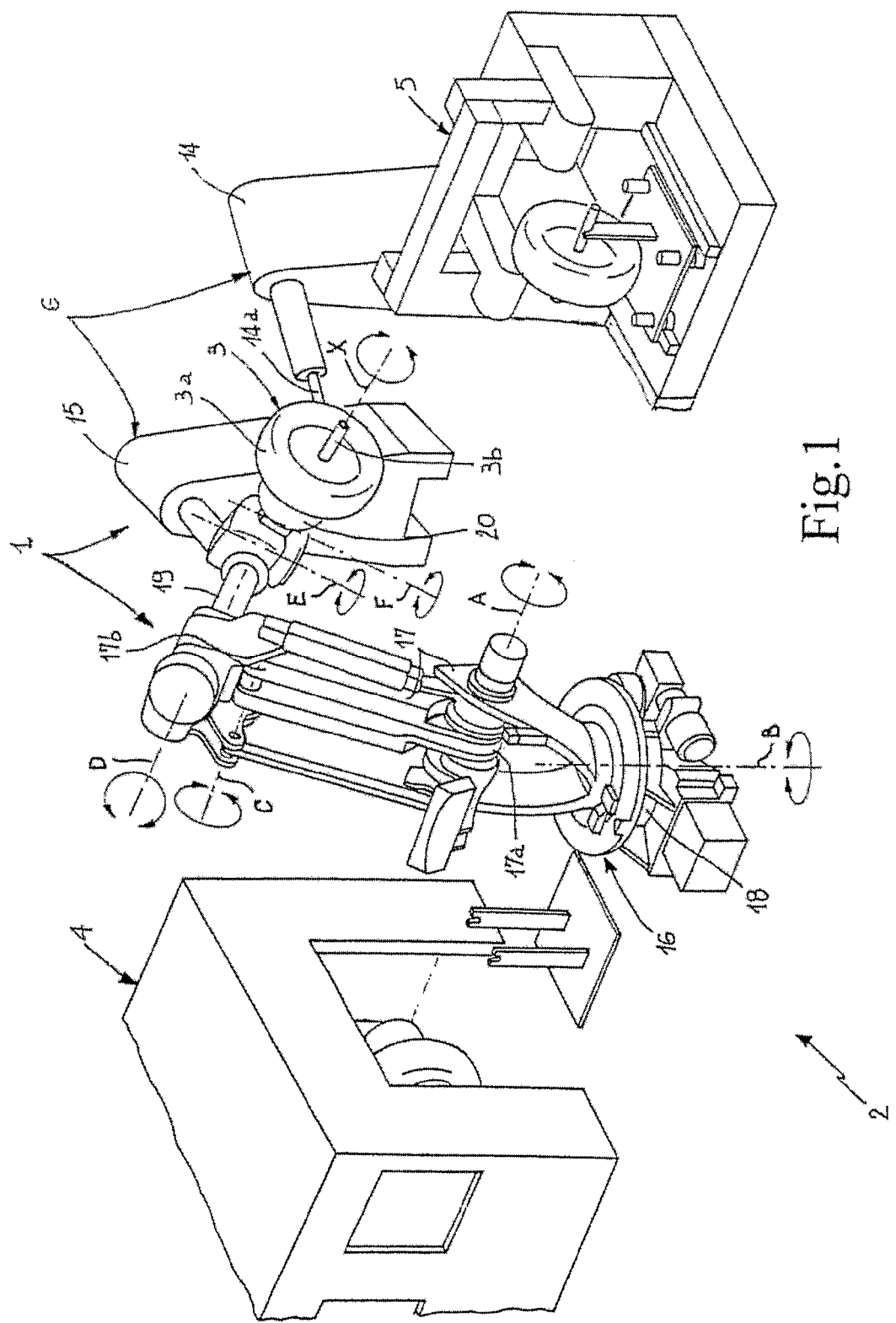
FIG. 1 shows an apparatus for manufacturing tyres for vehicle wheels on a substantially rigid toroidal support.

With reference to FIG. 1, a preferred embodiment of an apparatus for manufacturing tyres for vehicle wheels has been generally identified by reference numeral 1. Apparatus 1 is associated with a plant 2 intended for producing tyres for vehicle wheels or executing a part of the workings of the tyre production cycle.

Within these workings, manufacturing of different tyre components is included, which components are obtained directly on a substantially rigid toroidal support 3 having an outer surface 3a, 3b, the shape of which substantially matches the inner shape of the tyre itself. For such purpose, plant 2 may generally comprise a plurality of work stations 4, 5, 6 each intended for carrying out at least one of said workings aiming at manufacturing the tyre on the toroidal support 3.

In more detail, in the example shown in FIG. 1 and described by way of example only, a portion of plant 2 is shown which is arranged to form a carcass structure on the outer surface 3a, 3b of the toroidal support 3. The carcass structure comprises at least one first carcass ply such arranged as to cover the outer surface 3a, 3b of the toroidal support 3, at least one pair of annular reinforcing structures disposed at respective end edges of the carcass ply and an optional second carcass ply placed in superposed relationship with the first carcass ply and the annular reinforcing structures. Each annular reinforcing structure may comprise first and second annular inserts comprising at least one metal wire wound in several coils disposed in the form of a crown, and a filling body of elastomeric material axially interposed between the first and second annular inserts.

In the plant portion 2 intended for making the carcass structure may be for example provided a first work station 4 for executing a step of pre-heating the toroidal support 3, and/or for the optional application of a liner to the outer surface thereof, i.e. a thin rubber layer that, when vulcanization has been completed, will be airtight in order to ensure maintenance of the operating pressure in the tyre.

A second work station 5 can be in turn intended for forming carcass plies. Formation of each ply can be advantageously carried out by sequential deposition of strip-like elements disposed consecutively in side by side relationship in a mutually circumferential approach onto the outer surface 3a, 3b of the toroidal support 3. Further details as regards the manufacturing modalities of the carcass ply or plies in the second work station 5 are widely disclosed in European patent applications No. 928680 and No. 928702 in the name of the same Applicant.

A third work station 6 arranged to form the annular reinforcing structures at the inner end edges of the first carcass ply may also be provided. For the purpose, the third work station 6 comprises feeding devices arranged to supply one or more elongated elements to be employed in making the filling body and the annular inserts. In more detail the feeder devices may for example comprise a first extruder 14 arranged to supply, through a respective delivery member 14a, at least one first continuous elongated element, e.g. a strip of elastomeric material of predetermined cross-section size, to be employed for making the filling body of each of the annular reinforcing structures. More specifically, it is preferably provided for the cross section of the elastomeric strip emerging from the delivery member 14a of the first extruder 14 to have a conveniently reduced section as compared with the transversal cross-section of the filling body to be made. The filling body in its final configuration is obtained by delivery of a continuous elastomeric strip onto the toroidal support 3 while said support, upon the action of circumferential-distribution means, is driven in a rotary circumferential-distribution motion around a geometric axis of rotation thereof denoted by "X". Concurrently with the rotation imposed to the toroidal support 3, transverse-distribution means will give rise to controlled relative displacements between the toroidal support itself and the delivery member 14a associated with the first extruder 14, in such a manner that the elastomeric strip will form a series of coils disposed radially and/or axially in side by side relationship until they define the filling body.

The feeder means provided in the third work station 6 may further comprise at least one second extruder 15 arranged to supply, through a respective delivery member not shown in the drawings, a second continuous elongated element, e.g. a rubberized metal wire, to be employed for making the annular inserts being part of each annular reinforcing structure. Each annular insert is made by circumferentially laying down the respective rubberized metal wire onto the toroidal support 3, by virtue of the rotary circumferential-distribution motion imparted to said support around a geometric axis thereof denoted by "X". Meanwhile, a transverse-distribution movement is also carried out between the toroidal support 3 and the delivery member of the second extruder 15, in such a manner that the continuous elongated element will form a series of coils disposed consecutively in side by side relationship on moving away from or bring near to the rotation axis "X" of the toroidal support 3, so as to form the respective annular insert.

Both the circumferential-distribution movement, i.e. rotation of the toroidal support around its axis "X", and the transverse-distribution movement are preferably accomplished by directly moving the toroidal support 3. Under this circumstance, the extruders 14, 15 forming the means for feeding the elongated element can advantageously keep a fixed positioning during formation of the different components on the tyre being worked.

In order to provide suitable movement of the support 3, the circumferential-distribution means intended for driving the toroidal support in rotation around its axis "X", and the transverse-movement means may be integrated into a robotized arm generally identified by 16, arranged to engage removably and preferably in cantilever fashion the toroidal support 3, so as to sequentially bring the same in front of each of the work stations 4, 5, 6 and conveniently move it relative to said stations.

In particular the robotized arm 16, preferably of the anthropomorphic type with seven axes, comprises a first section 17 having a first end 17a connected to a support platform 18 for rotation around a first horizontally-disposed oscillation axis "A", and around a second axis "B" disposed vertically or at all events perpendicular to the first oscillation axis "A". The robotized arm 16 further comprises a second section 19 associated to a second end 17b of the first section 17, with possibility of oscillation about a third axis "C", preferably parallel to the first axis "A" and also around a fourth oscillation axis "D" perpendicular to the third axis "C" and preferably disposed longitudinally of the second section itself. An end head 20 is operatively associated, at its end, with the second section 19 and is such arranged as to removably engage the toroidal support 3. The end head 20 is susceptible of oscillation around a fifth axis "E", perpendicular to the fourth oscillation axis "D". In a preferential solution, the fifth axis "E" is coplanar with the fourth axis "D", and the end head 20 is in addition susceptible of oscillation around a sixth axis "F" perpendicularly oriented relative to the toroidal support 3, and relative to the fifth axis of oscillation "E".

Employment of the transverse-distribution means directly operating on the toroidal support 3 offers the advantage of being able to use the same robotized arm 16 both for managing movement of the toroidal support 3 in front of the individual extruders 14, 15 and/or other feeder means provided in the first, second, third and other possible work stations, and for causing transfer of the toroidal support from a work station to another one.

In particular, in the example shown the robotized arm 16 picks up the toroidal support 3 from the first work station 4 in order to transfer it to the second work station 5 for the purpose of forming the first carcass ply. During formation of the first carcass ply, the toroidal support 3 preferably stays in engagement with the robotized arm 16 that advantageously carries out suitable orientation of support relative to the devices for delivering and laying down the strip-like elements provided in the second station itself, and drives it in rotation according to a step-by-step movement around the geometric axis "X", in synchronism with operation of the above mentioned delivery and deposition devices or other convenient delivery and deposition means, so as to cause distribution of the strip-like elements according to a predetermined circumferential pitch.

Subsequently, the toroidal support 3 is picked up from the second work station 5 to be brought in front of the first extruder 14 of the third work station 6, for the purpose of forming the first annular insert of each annular reinforcing structure. The toroidal support 3 is then brought in front of the second extruder 14 of the third work station 6, in order to give rise to formation of the filling body of each annular reinforcing structure, to be then shifted again in front of the first extruder 14 for the purpose of enabling accomplishment of the second annular insert and thus completing formation of the annular reinforcing structures.

Mobility of the toroidal support in the six oscillation axes "A", "B", "C", "D", "E", "F", in addition to driving in rotation of the same around the geometric axis "X", enables a correct deposition of the elongated elements coming from extruders 14, 15 to be carried out, irrespective of the conformation of the toroidal support 3 and the tyre components to be obtained.

When formation of the annular reinforcing structures has been completed, the toroidal support 3 can be transferred again to the second work station 5 to enable formation of a second carcass ply in the same manner as previously described in connection with the first carcass ply, thus completing manufacture of the tyre carcass structure.

The same robotized arm 16, or one or more similar robotized arms installed in respective adjacent work areas provided in plant 2, can be designed for movement of the toroidal support 3 in front of further extruders or other feeding devices arranged to deliver the elongated elements provided for accomplishment of further tyre components, such as sidewalls, tread band, belt layers for example, as well as for carrying out transfer of the toroidal support to other work stations designed for vulcanization of the thus formed green tyre, for example.

Movements of the first section 17, the second section 18 and the end head 20 around the respective oscillation axes "A", "B", "C", "D", "E", "F" may be managed by respective motors. Operation of all motors associated with the transverse-distribution means or with the circumferential-distribution means may be managed by an electronic control unit (not shown) in a manner adapted to ensure correct movement of the toroidal support 3 in the respective work stations 4, 5, 6, for the purpose of obtaining a correct formation of the tyre components. Such correct movement of the toroidal support 3 can be governed by positioning specification sets (typically, one positioning specification for the formation of one respective tyre structural part), provided to the electronic control unit. In practice, the positioning specification sets may be computer files comprising a plurality of positioning records, specifying space coordinates to be sequentially followed by the toroidal support 3 during the deposition of the elongated elements provided by the feeder means 14, 15. By way of example, a single positioning record included in the specification files may comprise two spatial coordinates (Xi, Yi), orthogonal to each other, defining a point in a reference plane and an angle $\beta i$ to be presented by the toroidal support 3 versus the nose 14a of the extruder 14. In order to complete information relative to the trajectory of the toroidal support in the space, a fourth parameter Ri may be provided, defining the number of complete rotations that are needed to the toroidal support 3 in order to reach the spatial position in the above mentioned reference plane defined in the following positioning record.

The above mentioned specification files may be preferably generated by a suitable computer program, such as for example a program as disclosed in the PCT patent application WO 02/05143, in the name of the same Applicant, the general features of which are herein briefly recalled. Once the cross-section profile of the various components of the green tyre to be formed has been defined, such profile may be displayed by a graphic tool on the screen of a computer to an operator. The operator "fills" the cross-section profile of the various structural parts comprising elastomeric material with a basic element of corresponding material, by arranging, next to each other, a plurality of cross-sections of said element. The dimensions of the basic element to be used, in particular its width and its height, as well as the elastomeric material from which it is made, have predefined values. In particular, different structural parts of the tyre may need different elastomeric compositions.

For example, by means of a manual dragging device, the operator arranges the cross sections of the basic elements within the cross-section profile of the various structural parts of the tyre, superimposing them partially on top of each other. This operation may be performed by selecting, for example by means of the computer mouse, a cross-section of the basic element made available by the program and dragging it into the shape to be filled which is graphically displayed, until it is positioned in the vicinity of its final arrangement position. The program determines exactly the final position of each element, calculating its shape modification, due to the plasticity of the material forming the element, caused by any stretching during deposition and by the mutual overlapping with the adjacent elements. This modification in the cross sectional shape of the basic elements is calculated on the basis of the previously stored characteristics of the material from which the element is made.

For each section positioned within the shape, the following parameters may thus be stored in a record of a specification file:

the position (Xi, Yi) of a predetermined point, for example the middle point of one side of the element cross-section, with respect to a predetermined reference frame, for example a pair of Cartesian axes, integral with the toroidal support, the angle of orientation $\beta i$ of the deposited section with respect to a predetermined reference frame, for example the axis of rotation of the toroidal support.

The operator then may select a further element and, using the same procedure, arrange the same in the vicinity of the previous element. The program determines, as explained before, the final position of the further element, partially superimposing the same on the previous element, and deforming it according to its degree of plasticity. The operator may further configure the number of rotations Ri that the toroidal support should perform in order to allow the further element to reach the chosen position starting from the position of the previous element. In preferred embodiments, such parameter Ri may be set to one by default.

The procedure continues until all the space intended for the structural part under working has been completely filled with the basic element cross-sections, so as to completely define the positioning specification for the operating procedure, i.e. the manufacturing instructions necessary for allowing the robot to correctly dispose the extruded elastomeric element onto the toroidal support.

The above procedure is repeated for each structural part to be formed by the superimposing of the basic elements, so as to reproduce, in practice, the actual deposition of the elements needed for forming the whole tyre.

Figure 2:
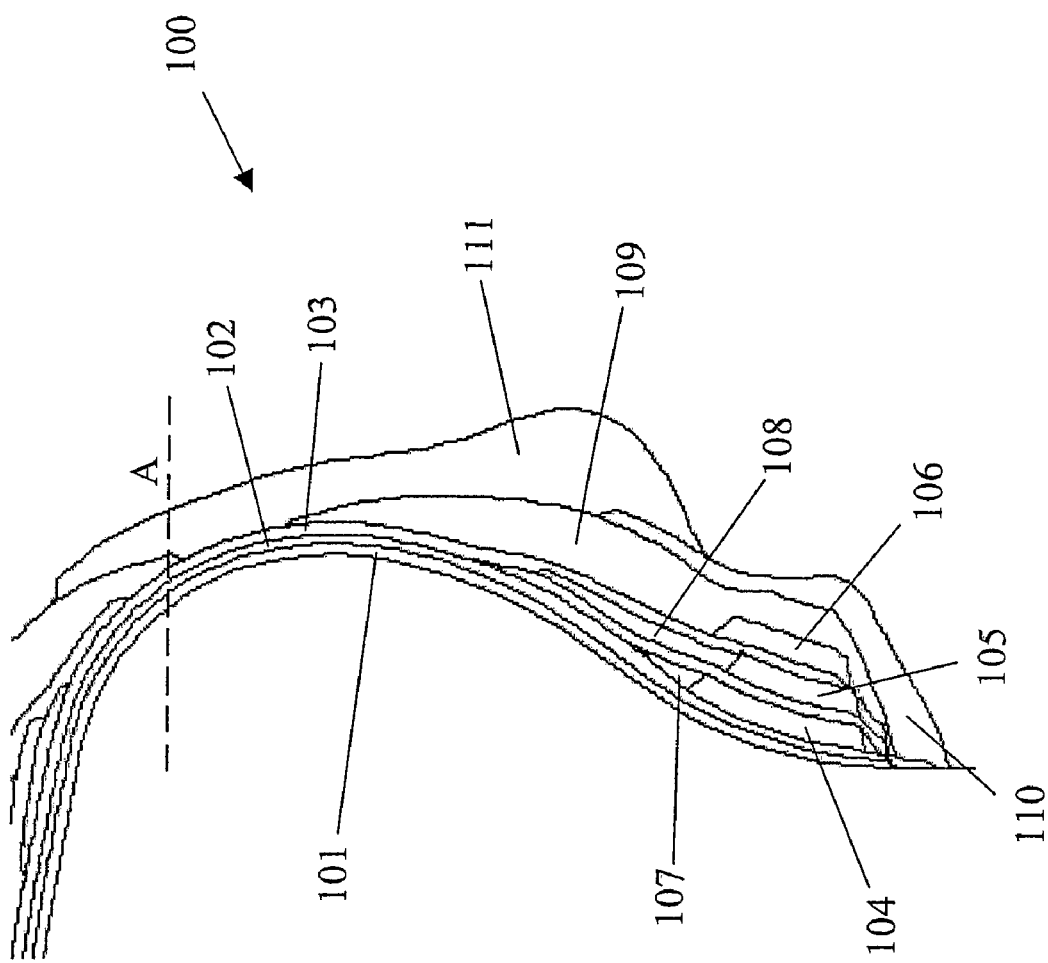
FIG. 2 shows a portion of a cross-section of a green tyre ready to be molded and cured.

FIG. 2 shows, by way of example, a cross-section of the sidewall and bead portion of a green tyre 100 ready to be molded and cured in a vulcanization mold. The green tyre 100 comprises a first liner layer 101, a second liner layer 102, a carcass ply 103, a reinforcing bead structure comprising three annular inserts, 104, 105, 106 associated to respective inserts 107, 108, 109, an anti-abrasive layer 110, a sidewall 111. The green tyre 100 is disposed on the toroidal rigid support (not shown in FIG. 2), to be molded and cured in a vulcanization mold in which a molding cavity is formed between the outer surface of the toroidal rigid support, the inner surface of a plurality of segments assuring exterior molding of the tread and the inner surface of two side parts of the vulcanization mold, assuring molding of the sidewalls of the tyre. For the purposes of the present invention, by "rigid" (as referred to the toroidal support) there is to be understood "substantially non-deformable" as compared with a conventional inflatable vulcanization membrane which, by definition and construction, is highly deformable as compared with other parts of a conventional mold which undergo very slight elastic deformations due to stresses exerted by the molding pressure.

The molding cavity comprises at least a portion in which molding and curing is carried out at a constant volume, i.e. a portion in which the volume available in the molding cavity and the volume of a corresponding portion of green tyre 100 substantially match, after closure of the mold. According to a preferred embodiment, in a remaining portion of the molding cavity, the available volume of the molding cavity portion may be higher than the volume of the corresponding portion of the green tyre, so that an interspace may be formed between the outer surface of the green tyre to be molded and cured and the inner surface of the vulcanization mold after closure of the mold. According to this preferred embodiment, the molding of the outer surface of the green tyre corresponding to the above portion of the green tyre not in contact with the inner surface of the vulcanization mold after closure of the same may be obtained by expanding the green tyre in correspondence of that portion by feeding a fluid under pressure into the diffusion interspace that forms between the outer surface of the support and the inner surface of the green tyre (as disclosed for instance in the above cited PCT patent application WO 01/00395).

In a preferred embodiment, the portion of the green tyre which is molded and cured at a constant volume corresponds to the bead region and to the sidewalls or at least a major portion of the latter, while the portion of the tyre that is molded and cured upon expansion corresponds to a crown region of the tyre including the tread and possibly a minor portion of the sidewalls. In FIG. 2, a dashed line A represents an exemplary radially outer limit of the portion of green tyre 100 to be molded and cured at a constant volume in this preferred embodiment.

Figure 3:
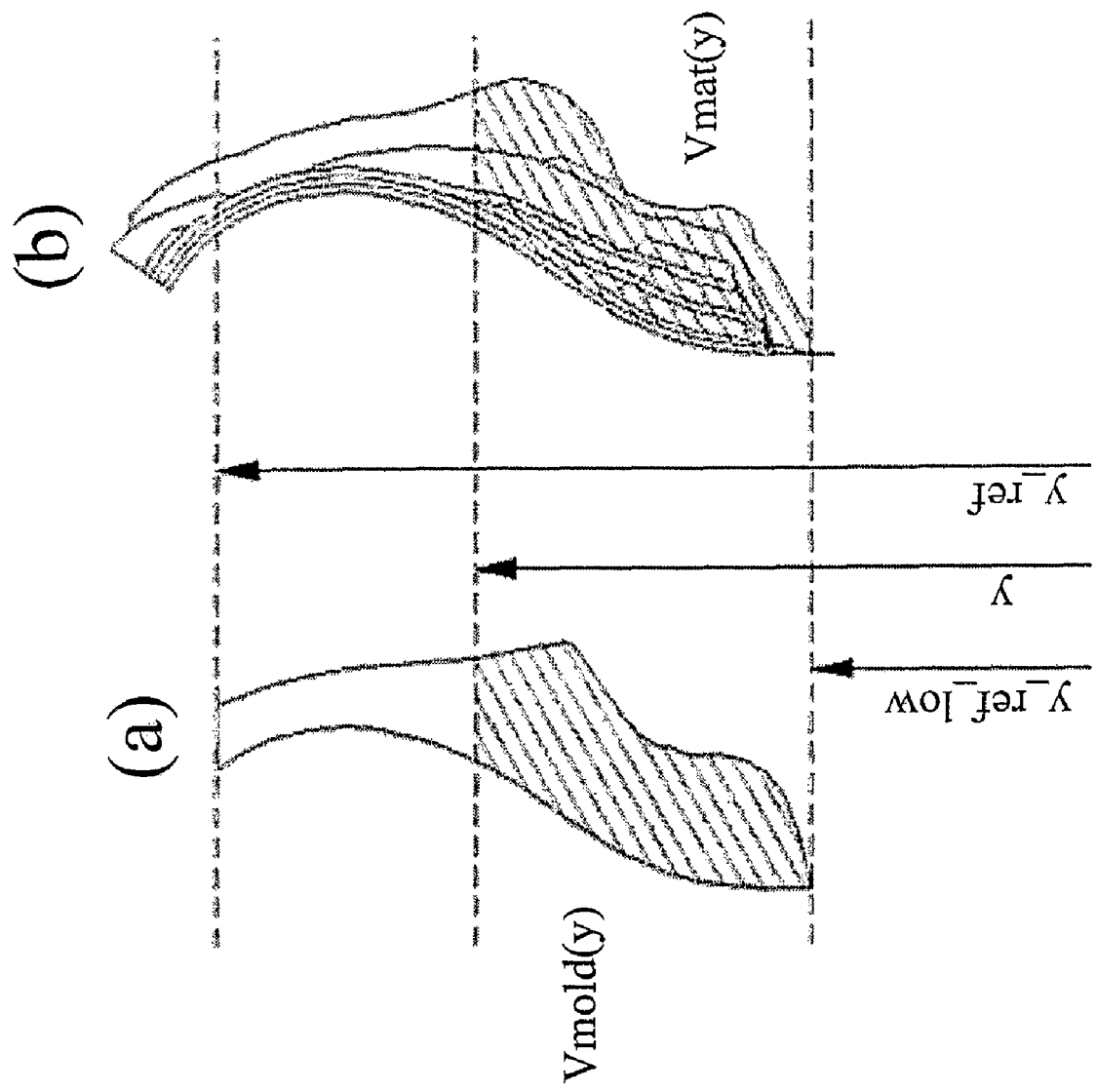
FIGS. 3a and 3b show, respectively, a portion of a molding cavity and a corresponding portion of a green tyre to be molded and cured in such molding cavity.

FIGS. 3a and 3b respectively show a portion of the molding cavity of a vulcanization mold adapted to mold and cure a green tyre at a constant volume in the sidewall and bead region, and the corresponding portion of the green tyre to be molded and cured. Typically, the overall volume of the material forming the green tyre portion to be molded and cured at a constant volume is slightly greater than the volume available in the molding cavity, of a percentage that can reach 10-15%.

A problem, verified by the Applicant, related to the molding and curing of at least a portion of the green tyre at a constant volume is that the volume of the material forming the green tyre disposed on the rigid toroidal support should be controlled, in order to avoid unexpected movements of elastomeric material within the mold, with the consequent formation of defects and/or geometrical distortions in the molded and cured tyre, or, in the worst cases, a damaging of the mold itself.

However, the Applicant has found that the sole check of the overall volume of material disposed on the rigid toroidal support versus the available volume in the molding cavity is not sufficient to guarantee the obtainment of a molded and cured tyre without defects and/or geometrical distortions.

Instead, the Applicant has found that it is important to monitor how the difference between the volume of the material disposed on the toroidal support and the available volume in the molding cavity varies versus a predetermined direction. In the remainder of the description and in the claims, a function describing the above mentioned volume difference will be referred as a function describing an "excess material volume". Preferably, the predetermined direction versus which the monitoring of the excess material volume can be performed is a radial direction of the tyre, indicated as y in FIGS. 3a, 3b. Following the notations indicated in FIGS. 3a, 3b, the excess material volume should be monitored in the portion of molding cavity in which molding and curing is carried out at a constant volume, i.e., between the two reference levels indicated as y_ref_low and y_ref. FIGS. 3a and 3b also show dashed portions $V_{mold}(y)$ and $V_{mat}(y)$, corresponding, respectively, to the available volume in the molding cavity and to the volume of the material disposed on the toroidal support up to a radial height y. Preferred excess material volume functions may be the following ones:

$$EM(y) = \frac{V_{mat}(y) - V_{mold}(y)}{V_{mold}(y)} \quad [1]$$

$$\Delta M(y) = V_{mat}(y) - V_{mold}(y) \quad [2]$$

$$EM_{loc}(y_1, y_2) = \frac{V_{mat}(y_1, y_2) - V_{mold}(y_1, y_2)}{V_{mold}(y_1, y_2)} \quad [3]$$

$$\Delta M_{loc}(y_1, y_2) = V_{mat}(y_1, y_2) - V_{mold}(y_1, y_2) \quad [4]$$

wherein $V_{mold}(y)$ and $V_{mat}(y)$ correspond to volumes calculated between y_ref_low and y, whereas $V_{mold}(y_1, y_2)$ and $V_{mat}(y_1, y_2)$ correspond to volumes calculated between $y_1$ and $y_2$. The quantities calculated from [1] and [3] may be preferably expressed as percentage values.

In particular, the Applicant has found particularly convenient to use the above function [1] in order to perform the analysis of the excess material volume. Such analysis can be preferably conducted with the aid of a computer program loadable into the memory of a computer.

The quantities $V_{mold}(y)$ and $V_{mat}(y)$, to be used in the above formulas [1], [2] or [3] may be determined by suitable calculations. More particularly, $V_{mold}(y)$ can be derived by storing an image file of a cross-section of the mold cavity portion destined to molding and curing at a constant volume, from which the area of the molding cavity up to the radial height y (dashed portion in FIG. 3a) can be determined, using conventional methods. To derive the volume $V_{mold}(y)$ from such area, the rotational symmetry of the molding cavity can be exploited. On the other hand, $V_{mat}(y)$ can be derived, using conventional methods, from the specification files defining the positioning and the dimensions of the basic elements forming the green tyre.

Figure 4:
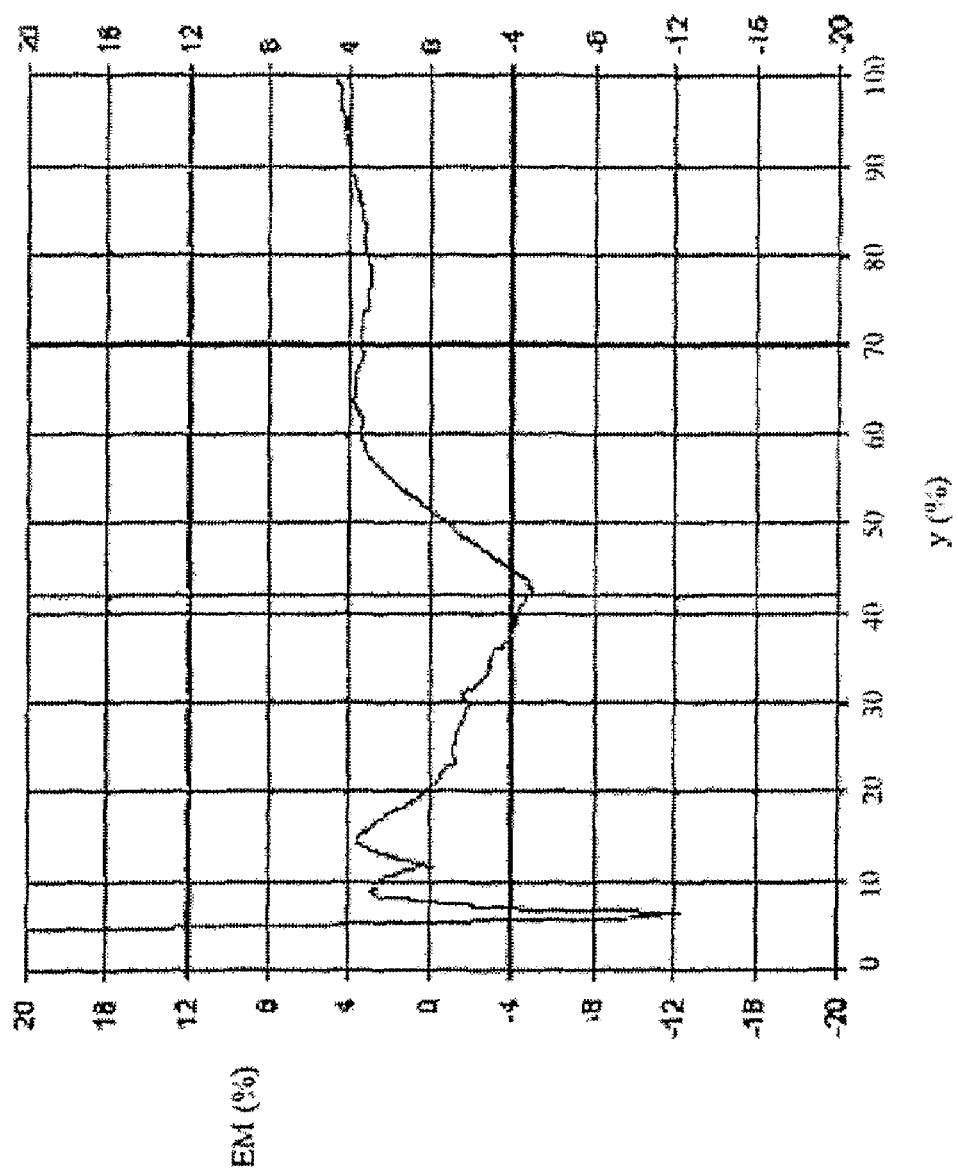
FIG. 4 shows a first exemplary excess material volume curve.

FIG. 4 shows the trend, versus the radial direction y, of the above function [1], derived from a set of specification files of an exemplary tyre (225/45R17 PZero Nero) produced by the Applicant with the above method, and from the corresponding molding cavity portion adapted for molding and curing at a constant volume. Such molding cavity portion extended from the radially lower point of the bead to just below the upper end of the sidewall (see dashed line at a radial height y_ref in FIG. 3a, 3b). The abscissa y is normalized so that y_ref_low corresponds to 0, and y_ref corresponds to 100. EM(y) is expressed using percentage values. It has to be noticed that the very first portion of the curve shows non-real high values of excess material volume, due to the fact that less than perfect calculation is performed in a very small portion of the molding cavity and of the green tyre near the edge of the bead. As it can be seen from the value reached from the curve in correspondence of an abscissa value of 100, the overall volume of green tyre in the portion to be molded and cured at a constant volume is in excess of about 5% with respect to the available volume in the molding cavity portion. It has also to be noticed that the value of the function EM just below an abscissa value of 50 is lower than zero: this means that approximately in the first 45% of the radial height of the mold the overall material volume is lower than the corresponding available volume in the mold.

Figure 5:
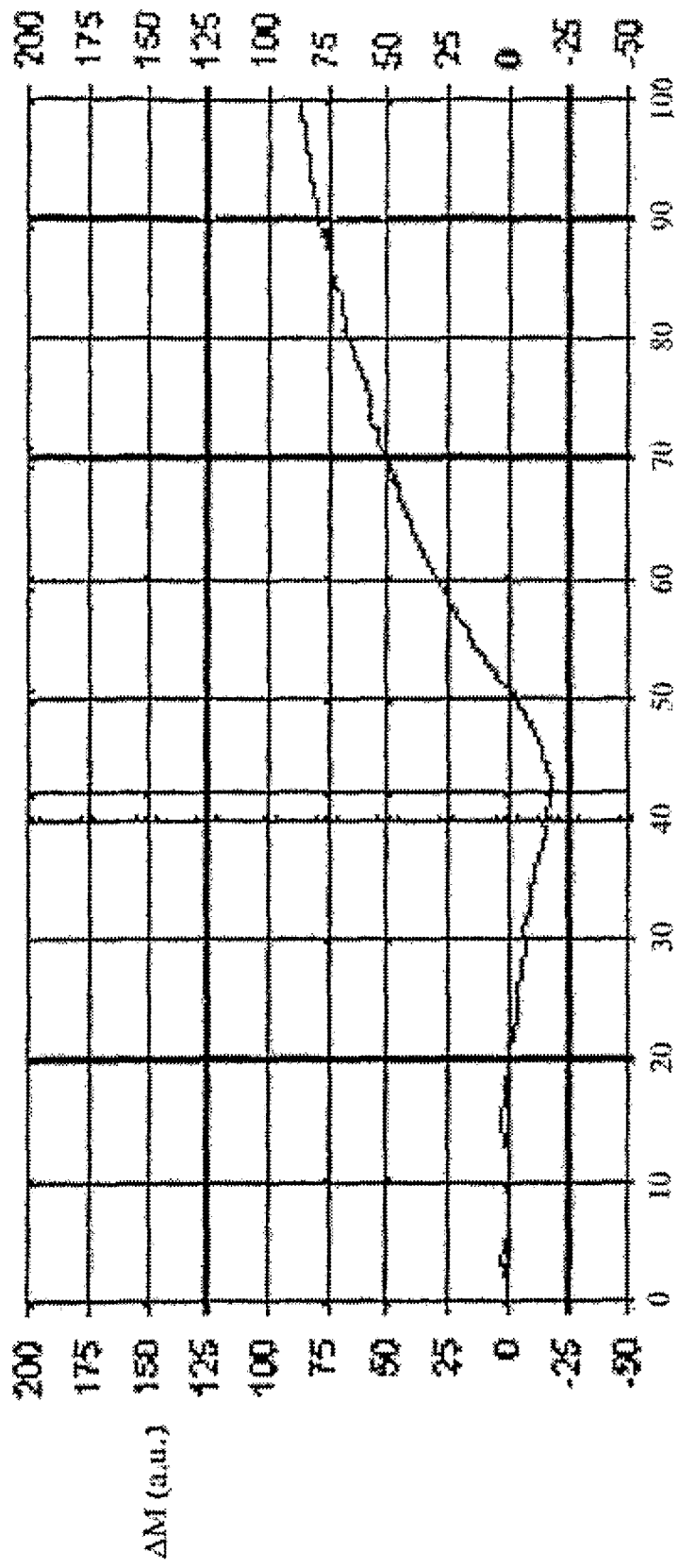
FIG. 5 shows a second exemplary excess material volume curve.

FIG. 5 shows the trend, versus the radial direction y, of the above function [2], corresponding to the same exemplary green tyre and mold of the curve of FIG. 4. The curve of FIG. 5 has a similar trend with respect to that shown in FIG. 4, with a lower enhancement of the variations caused by the local increase or decrease of material versus the available volume in the cavity.

Figure 6:
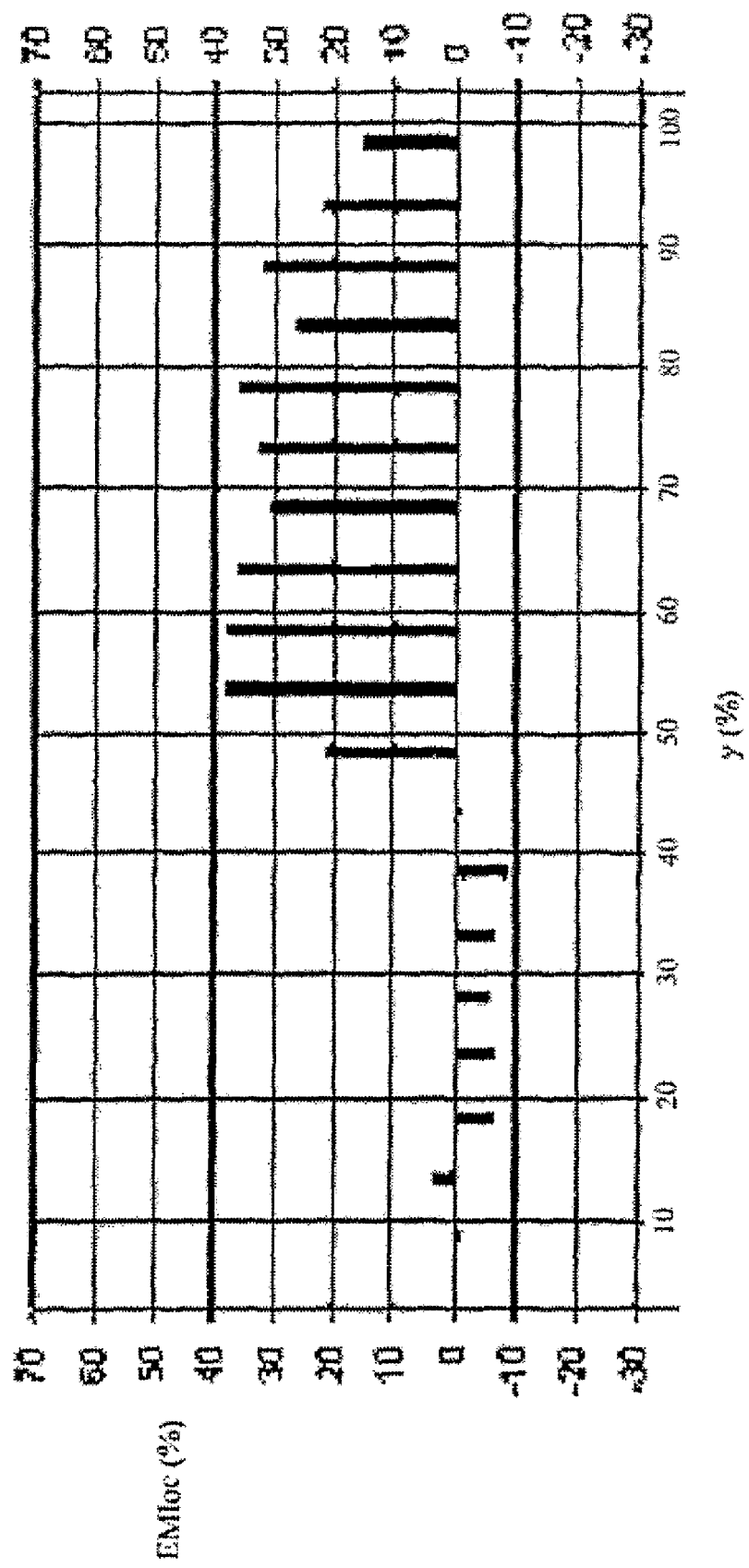
FIG. 6 shows a third exemplary excess material volume curve.

FIG. 6 shows the trend, versus the radial direction y, of the above function [3], corresponding to the same exemplary green tyre and mold of the curve of FIGS. 4 and 5. The function $EM_{loc}$ allows to easily recognize where, locally, the material volume is in excess versus the cavity volume, or vice versa. As it can be seen, strong local differences between the material volume and the cavity volume are revealed by FIG. 6 in a radially outer portion. FIG. 6 also shows that in a radially inner region, the molding cavity portion has a volume slightly greater with respect to the volume of a corresponding portion of green tyre.

The Applicant has found that the actual shape of the trend curve of an excess material volume function, such as the above mentioned functions [1], [2] or [3], may be used as guideline in order to define the set of positioning specifications for the machinery controlling the deposition of the elastomeric material on the toroidal support. More particularly, it has been found that if a green tyre is prepared by using a given set of specifications, and if such green tyre, after having been molded and cured at least partially at a constant volume in a vulcanization mold, stably provides a finished tyre with an acceptable level in terms of defects and geometrical distortions, then its excess material volume curve can be used as target curve for tuning the specification set, when a modification of such specification set is needed, for example in order to cope with a structural modification of the tyre. This situation is quite typical during the setup of a new tyre, for example, since a series of tests carried out on test tyres may result in several modifications of the dimensions and/or of the compositions of some structural parts of the tyre, in order to reach target specifications for the tyre in terms of grip, handling, behavior during a bend, behavior during braking, and so on. However, a modification of the set of specifications for forming the green tyre may lead to an unbalancing of the material distribution disposed on the toroidal support, and to a subsequent formation of defects and/or geometrical distortions on the finished tyre, after molding and curing at least partially at a constant volume. In these cases, a further modification of the specification set is required, so that the tuning of the whole process of definition of the specifications may require a long time, and a high quantity of manufacturing scraps, i.e., of tyres to be discarded.

Figure 7:
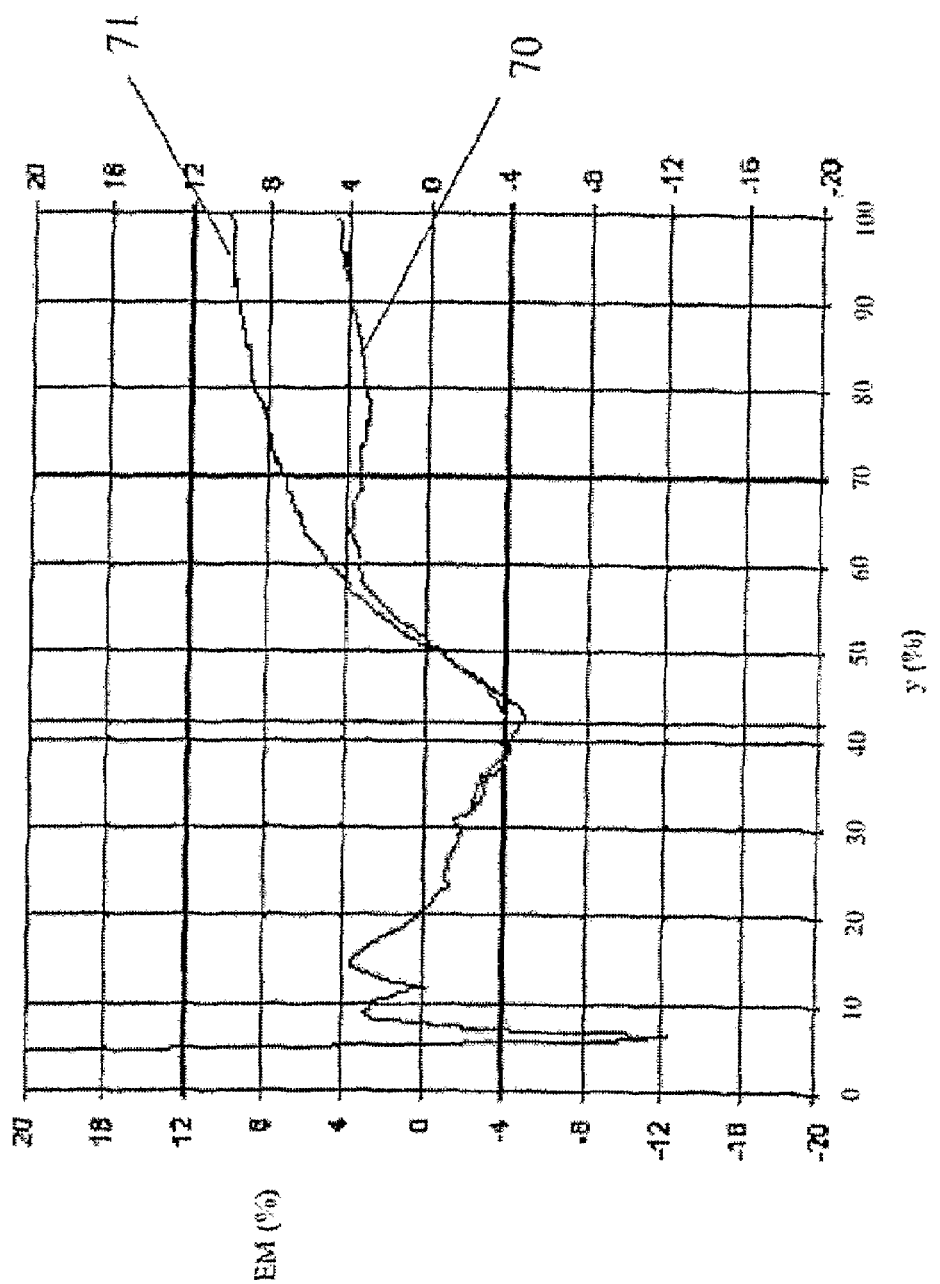
FIG. 7 shows a comparison between a target excess material volume curve and an excess material volume curve related to a new tyre model being planned.

By way of example, FIG. 7 shows two excess material volume curves 70 and 71, obtained by using the above mentioned function [1], for two green tyres being identical but for a different size of an axially outer insert (insert 109 in FIG. 2). In particular, curve 70 is the same curve of FIG. 4, and refers to a green tyre having an insert reaching a radially outer position lower of 10 mm and having an overall volume lower of 70 cc with respect to the insert of the green tyre related to curve 71. The modification of the insert was needed in order to avoid early formation of cracking in the radially outer portion of the sidewall, at the join with the tread band, so as to increase durability of the tyre. However, the green tyre of curve 71 behaved almost perfectly during molding and curing in the vulcanization mold in terms of presence of defects and geometrical distortions, a condition no more guaranteed after the insert modification.

As it can be seen from FIG. 7, the curves 10 and 71 are practically superimposed at low radial heights, and then separate in higher radial heights, corresponding to the fact that the insert modification involves only a modification in the radially outer portion of the tyre. It has also to be noticed that the overall volume of the green tyre related to curve 71 is about 10% higher than the available cavity mold volume, whereas the overall volume of the green tyre related to curve 70 is about 5% higher than the available cavity mold volume, due to the lower overall volume of the insert. Quite probably, the formation of defects after molding and curing in the green tyre related to curve 70 may have a relationship with this lower overall excess volume.

It has been found that, in order to correct the specifications for forming the green tyre related to curve 70, the curve 71 can be used as a target curve. By calculating the differences between the curve 71 and the curve 70, corresponding to volume distribution differences versus the radial direction between the two green tyres related to curves 70 and 71, a computer program (that may be the same program being adapted to calculate and show the trend of the excess material volume function) may derive a modified cross-section of the green tyre previously related to curve 70, and graphically show the same to an operator. The modified cross-section takes into account the volume differences calculated from the differences between the curves 70 and 71. A choice of the structural part of the tyre to be modified may be required to the operator before deriving the modified cross-section: if an inner structural part of the tyre is modified, corresponding modifications may be preferably applied to outer structural parts of the tyre. In this example, the sidewall profile was modified using the calculated volume differences versus the radial direction, in order to cope with the modification of the insert.

After deriving the new cross-section of the green tyre, or, preferably, of the structural parts of the tyre to be modified, the operator may use the above mentioned program adapted for reproducing the deposition of the elastomeric material on the toroidal support, in order to fill the new cross-section with the suitable elastomeric elements, and to generate the new specification files needed for forming the modified green tyre.

Figure 8:
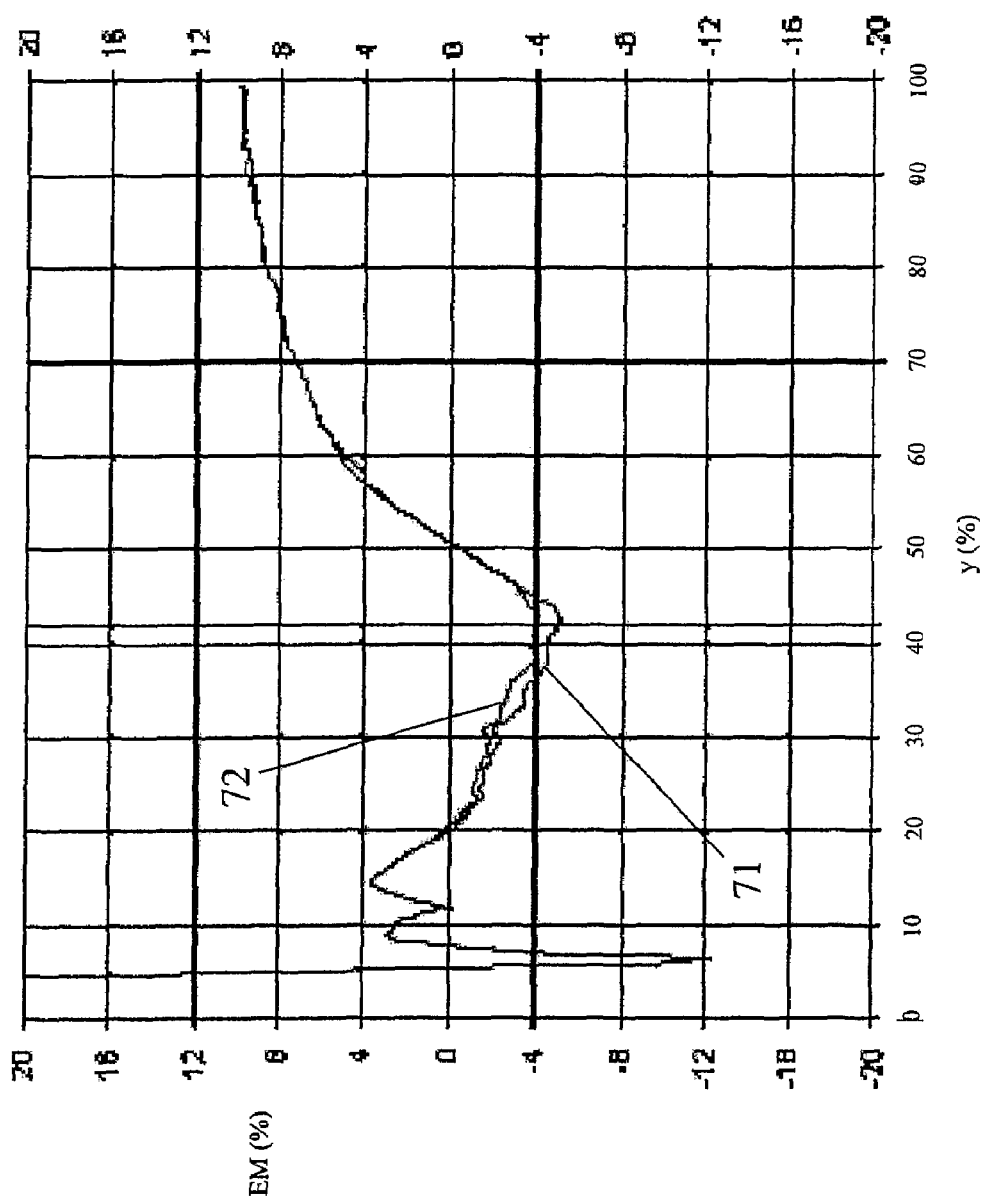
FIG. 8 shows a comparison between the target excess material volume curve and a further excess material volume curve corresponding to modified specifications for forming a green tyre for the new tyre model.

FIG. 8 shows the target curve of excess material volume 71, together with a new curve of excess material volume 72, corresponding to the new green tyre, obtained from specification files determined as explained above. As it can be seen, the two curves are practically superimposed with each other. The tyre corresponding to the green tyre of curve 72, after molding, was practically free of defects and geometrical distortions and had an increased durability with respect to the tyre corresponding to the green tyre of curve 70. The specification set for its formation on the toroidal support was advantageously tuned in a very short time, with a corresponding reduction of scrap tyres during the setup of the tyre.

An analysis similar to that shown with reference to FIGS. 7 and 8 could also be applied using the excess material functions [2] or [3] disclosed above. However, the Applicant has found particularly convenient to use the excess material function [1].

The invention has been explained with reference to an exemplary method of manufacturing tyres involving robotized machinery adapted to carry and to move/rotate a toroidal support with respect to an extruder of elastomeric material, in order to deposit strip-like elements onto the toroidal support to form the green tyre. Clearly, the exact shape of the basic element may be different from a strip-like shape, and can be for example a filament-like shape, or any other suitable shape. Furthermore, the feeding device may move alternatively to or in combination with the toroidal support, in a coordinated manner.

Furthermore, the Applicant believes that the invention can be applied also with more traditional methods of manufacturing tyres involving the formation of the green tyre to be molded and cured onto a rigid toroidal support, for insertion in a vulcanization mold for molding and curing at least partially at a constant volume. In such traditional methods, the various structural parts forming the green tyres are previously separately formed as semi-finished products, with a predetermined cross-section profile defined by suitable specifications, and then assembled together onto the toroidal support. The excess material volume functions can be calculated, in this case, provided that a cross-section of the green tyre to be formed is known, or, in other words, provided that the cross-section profile taken by the various semi-finished products when assembled onto the toroidal support is known.

Furthermore, the invention has been disclosed with reference to calculation of excess material volume functions versus a radial direction. However, another suitable direction can be selected for the analysis, for example an axial direction. Moreover, the excess material volume functions may calculated using the areas of the cross-sections of the green tyre and of the molding cavity, in place of the actual volume, especially in the case of calculation performed using functions [3], [4] above. Thus, the term "volume" has not to be interpreted, for the purposes of the present invention, as involving necessarily a volume in three spatial dimensions, and includes also a surface in two dimensions.

Moreover, the invention applies also to manufacturing methods in which molding cavities being wholly adapted for molding and curing at a constant volume are used, not only partially as explained in the disclosed examples.

The actual operations and/or calculations identified in the above disclosed analysis of the excess material curves may be implemented in suitable software code portions of one or more computer programs, and carried out by any well-known general purpose computer having appropriate processing abilities, as it will appear to those skilled in the art.

Generally speaking, the at least one computer program is adapted to be loaded into the memory of a computer comprising at least one CPU. The computer program can be for example embodied in one or more executable files, resident on a suitable support accessible from the memory of the computer, such as for example a hard disk, a diskette, a CD-ROM, a DVD-ROM or an external disk readable through a LAN. For the purposes of the present invention, the terms "computer program directly loadable into the memory of a computer" comprise files needed for the execution of the executable file or files, such as libraries, initialization files and so on, that can be resident on a suitable support accessible from the memory of the computer, such as a hard disk, a diskette, a CD-ROM, a DVD-ROM or an external disk readable through a LAN. Furthermore, for the purposes of the present invention the terms "computer program" also comprise files possibly different from the executable file or files and/or from the files needed for the execution of the same, embodied in an installable software, adapted, when run on the computer, to install the executable file or files, as well as the files needed for the execution of the same. Such installable software can be resident on a suitable support, such as a diskette, or a CD-ROM, a DVD-ROM or it can be available for download from a network resource, such as a server comprised in a LAN or reachable through an external network, for example the Internet.

The invention claimed is:

1. A method for manufacturing a tyre, comprising:
 disposing an uncured elastomeric material on a substantially rigid support for forming a green tyre;
 inserting said green tyre disposed on said support into a vulcanization mold;
 closing the vulcanization mold for defining a molding cavity between an outer surface of said support and an inner surface of said vulcanization mold; and
 molding and curing said green tyre, at least one portion of said green tyre being molded and cured at a substantially constant volume in at least one portion of said molding cavity;
 wherein said step of disposing said uncured elastomeric material on said support comprises:
   determining a first excess material volume curve of said elastomeric material with respect to an available volume in said at least one portion of said molding cavity versus a predetermined direction; and
   controlling a volume distribution of said elastomeric material on said rigid support so as to substantially fit said first curve.

2. The method according to claim 1, wherein said step of controlling said volume distribution of elastomeric material on said support comprises:
 determining a first positioning specification set for machinery associated with a deposition of said uncured elastomeric material on said support corresponding to said first excess material volume curve; and
 moving said machinery according to said first positioning specification set.

3. The method according to claim 2, wherein said step of determining said first excess material volume curve comprises:
 providing a target excess material volume curve;
 providing a second positioning specification set for said machinery;
 determining a second excess material volume curve corresponding to said second positioning specification set; and
 comparing said second curve with said target curve for determining volume distribution differences between said second curve and said target curve versus said predetermined direction.

4. The method according to claim 3, further comprising:
 determining a first cross-section profile of at least one portion of said green tyre from said second positioning specification set.

5. The method according to claim 4, further comprising:
 modifying said first cross-section profile using said volume distribution differences between said second curve and said target curve, thereby determining a second cross-section profile of said at least one portion of said green tyre.

6. The method according to claim 5, wherein said step of determining said first positioning specification set for said machinery comprises:
 determining said first positioning specification set at least from said second cross-section profile.

7. The method according to claim 3, wherein at least one of said first, second or target excess material volume curves represents the following function:

$$EM(y) = \frac{V_{mat}(y) - V_{mold}(y)}{C_{mold}(y)}$$

wherein y is a variable representing said predetermined direction, $V_{mat}(y)$ is a volume of said elastomeric material between a reference point of said vulcanization mold and a value y of said variable, and $V_{mold}(y)$ is a volume of said mold cavity between said reference point and said value y.

8. The method according to claim 3, wherein at least one of said first, second or target excess material volume curves represents the following function:

$$\Delta M(y) = V_{mat}(y) - V_{mold}(y)$$

wherein y is a variable representing said predetermined direction, $V_{mat}(y)$ is a volume of said elastomeric material between a reference point of said vulcanization mold and a value y of said variable, and $V_{mold}(y)$ is a volume of said mold cavity between said reference point and said value y.

9. The method according to claim 3, wherein at least one of said first, second or target excess material volume curves is the following function:

$$EM_{loc}(y_1, y_2) = \frac{V_{mat}(y_1, y_2) - V_{mold}(y_1, y_2)}{V_{mold}(y_1, y_2)}$$

wherein $y_1$, $y_2$ are two predetermined values of a variable representing said predetermined direction, $V_{mat}(y_1,y_2)$ is a volume of said elastomeric material between said values $y_1$, $y_2$, and $V_{mold}(y_1,y_2)$ is a volume of said mold cavity between said values $y_1$, $y_2$.

10. The method according to claim 3, wherein at least one of said first, second or target excess material volume curves is the following function:

$$\Delta M_{loc}(y_1,y_2) = V_{mat}(y_1,y_2) - V_{mold}(y_1,y_2)$$

wherein $y_1$, $y_2$ are two predetermined values of a variable representing said predetermined direction, $V_{mat}(y_1,y_2)$ is a volume of said elastomeric material between said values $y_1$, $y_2$, and $V_{mold}(y_1,y_2)$ is a volume of said mold cavity between said values $y_1$, $y_2$.

11. The method according to claim 3, wherein said predetermined direction is a radial direction.

12. The method according to claim 2, wherein said machinery comprises a robotized arm associated with said support.

13. The method according to claim 2, wherein said first positioning specification set comprises a plurality of positioning records, each of said positioning records comprising at least spatial coordinates of a predetermined point of a cross-section of an elongated element.

14. The method according to claim 1, wherein said step of disposing said uncured elastomeric material on said support comprises extruding said uncured elastomeric material in the form of elongated elements including said elastomeric material.

15. A method for controlling a disposition of an uncured elastomeric material on a rigid support for manufacturing a green tyre molded and cured in a vulcanization mold, said vulcanization mold and said rigid support defining a molding cavity such that at least one portion of said green tyre is molded and cured at a substantially constant volume in at least one portion of said molding cavity, comprising:
 providing a first positioning specification set for machinery associated with a disposition of said uncured elastomeric material on said support;
 providing a cross-section profile of at least said portion of said molding cavity; and
 determining, from said first positioning specification set and from said molding cavity cross-section profile, a first excess material volume curve of said uncured elastomeric material with respect to an available volume in said portion of the molding cavity, versus a predetermined direction and controlling disposition based on said determining step.

16. The method according to claim 15, further comprising:
 providing a target excess material volume curve; and
 comparing said first curve with said target curve, so as to determine volume distribution differences between said first curve and said target curve versus said predetermined direction.

17. The method according to claim 16, wherein said first or target excess material volume curve represents the following function:

$$EM(y) = \frac{V_{mat}(y) - V_{mold}(y)}{V_{mold}(y)}$$

wherein y is a variable representing said predetermined direction, $V_{mat}(y)$ is a volume of said elastomeric material between a reference point of said vulcanization mold and a value y of said variable, and $V_{mold}(y)$ is a volume of said mold cavity between said reference point and said value y.

18. The method according to claim 16, wherein said first or target excess material volume curve represents the following function:

$$\Delta M(y) = V_{mat}(y) - V_{mold}(y)$$

wherein y is a variable representing said predetermined direction, $V_{mat}(y)$ is a volume of said elastomeric material between a reference point of said vulcanization mold and a value y of said variable, and $V_{mold}(y)$ is a volume of said mold cavity between said reference point and said value y.

19. The method according to claim 16, wherein said first or target excess material volume curve represents the following function:

$$EM_{loc}(y_1, y_2) = \frac{V_{mat}(y_1, y_2) - V_{mold}(y_1, y_2)}{V_{mold}(y_1, y_2)}$$

wherein $y_1$, $y_2$ are two predetermined values of a variable representing said predetermined direction, $V_{mat}(y_1,y_2)$ is a volume of said elastomeric material between said values $y_1$, $y_2$, and $V_{mold}(y_1,y_2)$ is a volume of said mold cavity between said values $y_1$, $y_2$.

20. The method according to claim 16, wherein said first or target excess material volume curve represents the following function:

$$\Delta M_{loc}(y_1, y_2) = V_{mat}(y_1, y_2) - V_{mold}(y_1, y_2)$$

wherein $y_1$, $y_2$ are two predetermined values of a variable representing said predetermined direction, $V_{mat}(y_1,y_2)$ is a volume of said elastomeric material between said values $y_1$, $y_2$, and $V_{mold}(y_1,y_2)$ is a volume of said mold cavity between said values $y_1$, $y_2$.

21. The method according to claim 15, further comprising: determining a first cross-section profile of at least one portion of said green tyre from said first positioning specification set.

22. The method according to claim 21, further comprising: modifying said first cross-section profile using volume distribution differences between said first curve and a target curve, thereby determining a second cross-section profile of said green tyre portion.

23. The method according to claim 15, wherein said predetermined direction is a radial direction of said green tyre.

24. A storage medium comprising a computer program for performing a method for controlling a disposition of an uncured elastomeric material on a rigid support for manufacturing a green tyre molded and cured in a vulcanization mold, said vulcanization mold and said rigid support defining a molding cavity such that at least one portion of said green tyre is molded and cured at a substantially constant volume in at least one portion of said molding cavity, said program comprising code portions that when executed are capable of being adapted for;

acquiring a first positioning specification set for a machinery associated with a disposition of said uncured elastomeric material on said support; acquiring a cross-section profile of at least said portion of said molding cavity; and determining, from said first positioning specification set and from said molding cavity cross-section profile, a first excess material volume curve of said uncured elastomeric material with respect to an available volume in said portion of said molding cavity, versus a predetermined direction and controlling disposition based on said determining step.

25. The storage medium according to claim 24, further comprising code portions adapted for:

determining a target excess material volume curve; and comparing said first curve with said target curve, so as to determine volume distribution differences between said first curve and said target curve versus said predetermined direction.

26. The storage medium according to claim 25, wherein said first or target excess material volume curve represents the following function:

$$EM(y) = \frac{V_{mat}(y) - V_{mold}(y)}{V_{mold}(y)}$$

wherein y is a variable representing said predetermined direction, $V_{mat}(y)$ is a volume of said elastomeric material between a reference point of said vulcanization mold and a value y of said variable, and $V_{mold}(y)$ is a volume of said mold cavity between said reference point and said value y.

27. The storage medium according to claim 25, wherein said first or target excess material volume curve represents the following function:

$$\Delta M(y) = V_{mat}(y) - V_{mold}(y)$$

wherein y is a variable representing said predetermined direction, $V_{mat}(y)$ is a volume of said elastomeric material between a reference point of said vulcanization mold and a value y of said variable, and $V_{mold}(y)$ is a volume of said mold cavity between said reference point and said value y.

28. The storage medium according to claim 25, wherein said first or target excess material volume curve represents the following function:

$$EM_{loc}(y_1, y_2) = \frac{V_{mat}(y_1, y_2) - V_{mold}(y_1, y_2)}{V_{mold}(y_1, y_2)}$$

wherein $y_1$, $y_2$ are two predetermined values of a variable representing said predetermined direction, $V_{mat}(y_1,y_2)$ is a volume of said elastomeric material between said values $y_1$, $y_2$, and $V_{mold}(y_1,y_2)$ is a volume of said mold cavity between said values $y_1$, $y_2$.

29. The storage medium according to claim 25, wherein said first or target excess material volume curve represents the following function:

$$\Delta M_{loc}(y_1,y_2)=V_{mat}(y_1,y_2)-V_{mold}(y_1,y_2)$$

wherein $y_1$, $y_2$ are two predetermined values of a variable representing said predetermined direction, $V_{mat}(y_1,y_2)$ is a volume of said elastomeric material between said values $y_1$, $y_2$, and $V_{mold}(y_1,y_2)$ is a volume of said mold cavity between said values $y_1$, $y_2$.

30. The storage medium according to claim 24, further comprising code portions adapted for:

determining a first cross-section profile of at least one portion of said green tyre from said first positioning specification set.

31. The storage medium according to claim 30, further comprising code portions adapted for:

modifying said first cross-section profile using volume distribution differences between said first curve and said target curve, thereby determining a second cross-section profile of said green tyre portion.

32. The storage medium according to claim 24, wherein said predetermined direction is a radial direction of said green tyre.

* * * * *

UNITED STATES PATENT AND TRADEMARK OFFICE
CERTIFICATE OF CORRECTION

PATENT NO. : 7,620,474 B2
APPLICATION NO. : 10/583774
DATED : November 17, 2009
INVENTOR(S) : Bruschelli et al.

It is certified that error appears in the above-identified patent and that said Letters Patent is hereby corrected as shown below:

Claim 7, column 15, lines 46-47,

" $EM(y) = \dfrac{V_{mat}(y) - V_{mold}(y)}{C_{mold}(y)}$ " should read -- $EM(y) = \dfrac{V_{mat}(y) - V_{mold}(y)}{V_{mold}(y)}$ --.

Claim 24, column 18, line 5, "for;" should read --for:--.

Signed and Sealed this
Fifth Day of April, 2011

David J. Kappos
*Director of the United States Patent and Trademark Office*